(No Model.) 2 Sheets—Sheet 1.

J. MACPHAIL.
CULTIVATOR.

No. 507,552. Patented Oct. 31, 1893.

Witnesses
Wm. J. Henning
Wm. M. Rheem

Inventor
James Macphail
by Bond, Adams, Pickard & Jackson his Attys (No Model.) 2 Sheets—Sheet 2.
J. MACPHAIL.
CULTIVATOR.
No. 507,552. Patented Oct. 31, 1893.
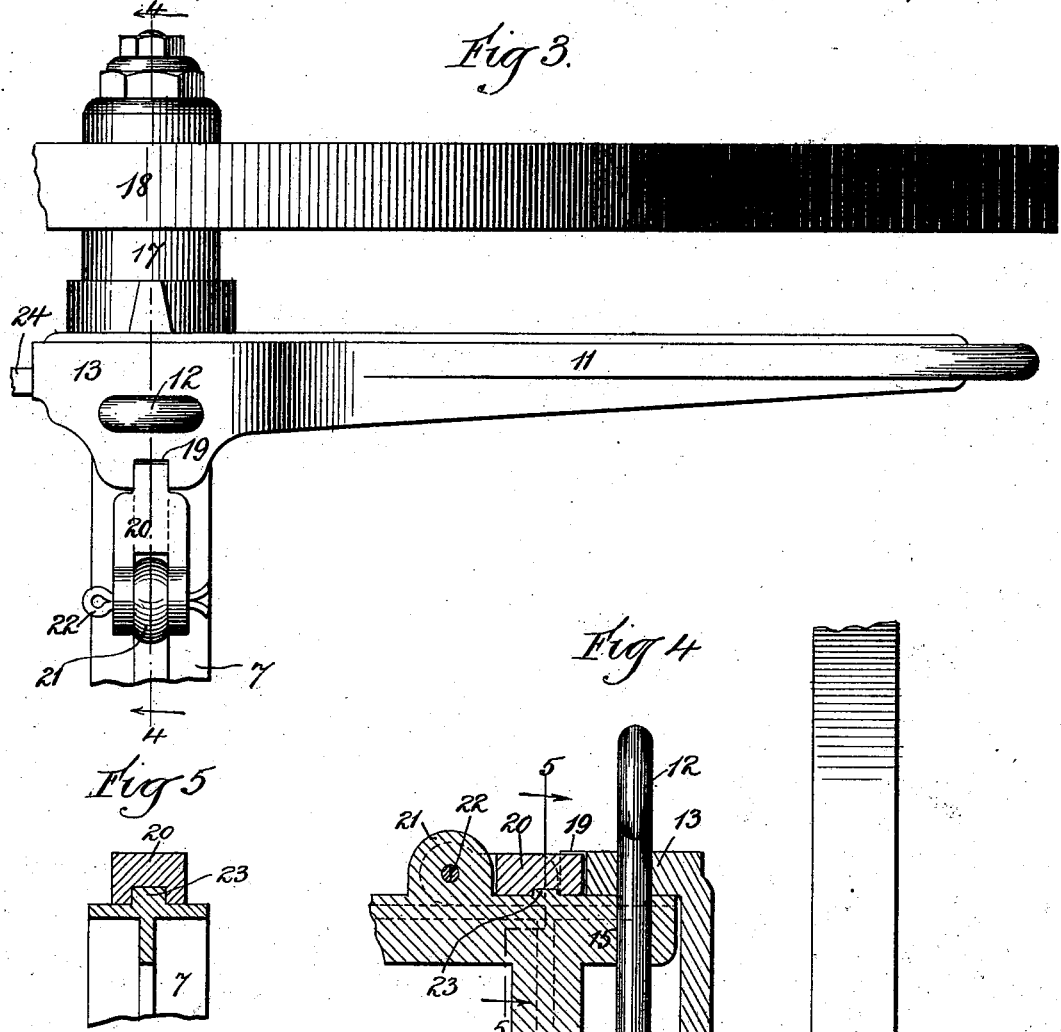
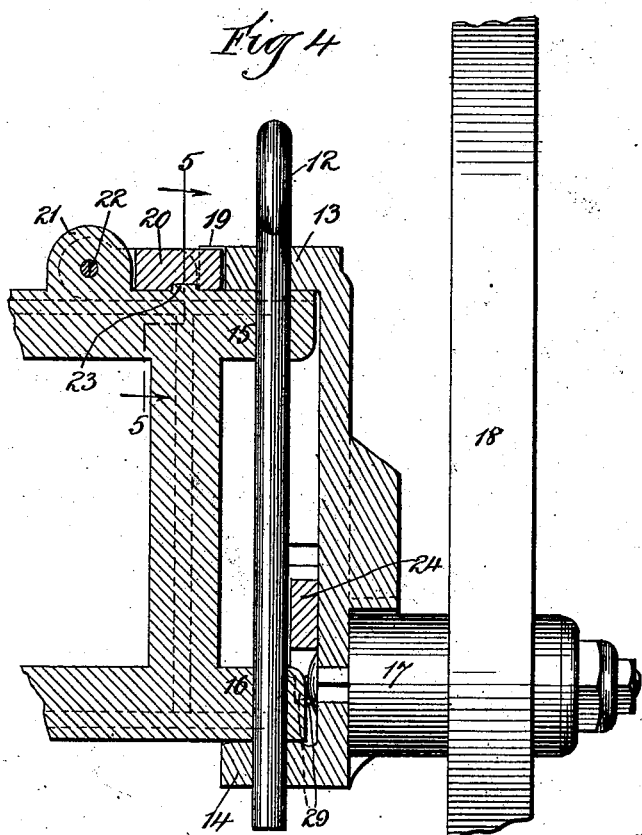
Witnesses
Wm. F. Henning
Wm. M. Rheem
Inventor
James Macphail
by Bond, Adams, Pickard & Jackson
his Attys.

UNITED STATES PATENT OFFICE.

JAMES MACPHAIL, OF ROCKFORD, ASSIGNOR TO ABRAM ELLWOOD, OF DE KALB, ILLINOIS.

CULTIVATOR.

SPECIFICATION forming part of Letters Patent No. 507,552, dated October 31, 1893.

Application filed June 1, 1893. Serial No. 476,273. (No model.)

*To all whom it may concern:*

Be it known that I, JAMES MACPHAIL, a citizen of the United States, residing at Rockford, Winnebago county, Illinois, have invented certain new and useful Improvements in Cultivators, of which the following is a specification, reference being had to the accompanying drawings, in which—

Figure 1:
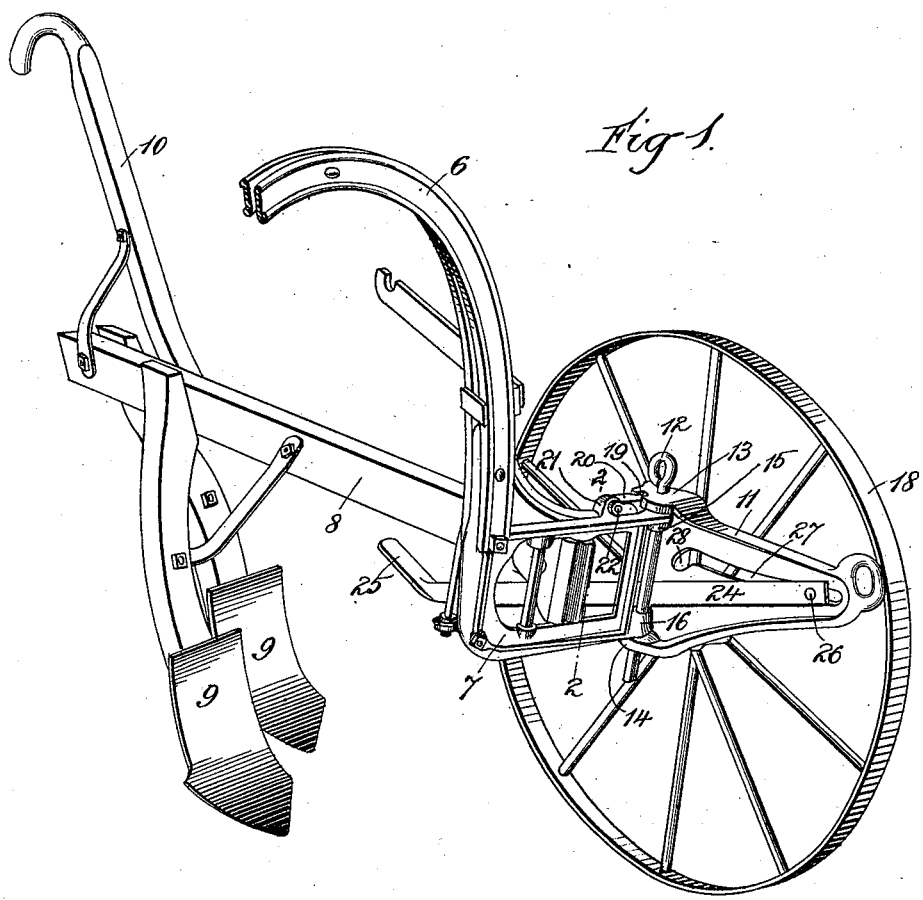
Figure 2:
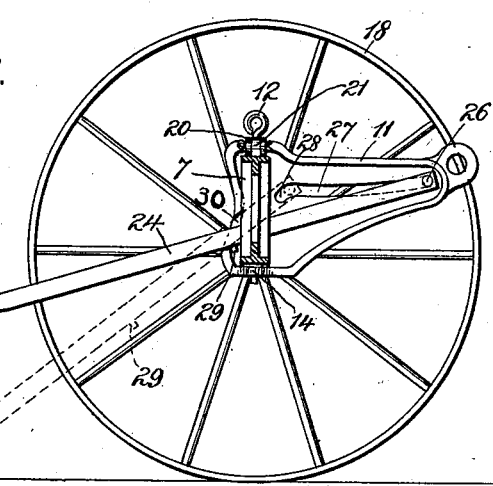

Figure 1 is a perspective view of half of the cultivator. Fig. 2 is a section on line 2—2 of Fig. 1. Fig. 3 is an enlarged detail, being a top or plan view of one of the draft frames, the locking mechanism, and a portion of one of the wheels. Fig. 4 is an enlarged detail, being a section on line 4—4 of Fig. 3; and Fig. 5 is an enlarged detail, being a section on line 5—5 of Fig. 4.

My invention relates to cultivators, and particularly to that class commonly known as tongueless cultivators, in which the whiffletrees are hitched to draft frames pivotally connected to the opposite sides of the cultivator arch. In cultivators of this description the wheels are mounted upon stud axles carried by the draft frames, so that they are free to swing in a horizontal plane, thereby bringing the wheels into different positions with relation to the line of draft. Owing to the fact that the wheel axles are pivotally mounted, as above stated, the cultivator will not stand up when not in motion, as the wheel axles will swing horizontally under the weight of the implement and will permit it to fall.

One feature of my present invention consists in the provision of locking devices by means of which the wheel axles may be locked in position and the wheels thereby prevented from swinging, as above set forth.

Another feature of my invention consists in providing improved locking devices for the legs commonly used to support the cultivator in an upright position, so that said legs may be locked out of operative position when desired.

What I regard as my invention will be set forth in the claims.

In the drawings I have shown one-half of the cultivator, as that is sufficient to fully illustrate my invention; the other half of the cultivator being an exact counterpart of that shown.

6 indicates the arch of the cultivator, which may be of any approved construction.

7 indicates a bracket secured to the lower end of the arch and projecting laterally therefrom, as shown in Fig. 1.

8 indicates the cultivator beam, which is coupled to the bracket 7 and carries shovels 9 and a handle 10, as shown in Fig. 1.

11 indicates a draft frame, the rear end of which is pivotally connected to the bracket 7 by means of a pin 12 which passes through ears 13—14 in the frame 11 and through ears 15—16 in the bracket 7, as best shown in Figs. 1 and 4. By this construction the draft frame 11 may swing freely in a horizontal plane.

17 indicates a stud axle, which projects laterally from the rear end of the draft frame 11, as shown in Fig. 4. It may be formed integral therewith or be secured thereto in any suitable manner.

18 indicates one of the cultivator wheels, which is journaled upon the axle 17.

As shown in Figs. 1 and 4, the ear 13 is provided in its inner edge with a recess 19, which recess is adapted to receive the end of a dog 20 which is pivotally mounted upon the upper side of the bracket 7. I have shown the dog 20 as pivoted to the lug 21 by a split key 22, but I do not wish to limit myself to that construction specifically. The dog 20 is provided in its under side with a recess adapted to receive a lug 23 formed on the upper side of the bracket 7, which construction prevents lateral displacement of the dog 20. The recess 19 and dog 20 are so placed that said dog will enter the recess when the draft frame 11 is at right angles to the bracket 7, and when the dog is in the recess 19 the wheel 18 will be prevented from swinging. When the cultivator is in operation the dog 20 is thrown upward out of operative position, thereby leaving the draft frame 11 free to swing, as necessary.

To support the cultivator when the wheels 18 are locked at right angles to the arch, I provide a leg 24 at each side of the cultivator, which legs are provided at their lower ends with flattened portions 25 and at their upper ends with pins 26, as best shown in Figs. 1 and 2. Each draft frame 11 is provided with a slot 27, the rear end of which is curved downward, as shown at 28 in Fig. 1, and the pins 26 are adapted to move in the slots 27.

29 indicates a pin, one of which projects from each leg 24, as shown in Fig. 2. Each draft frame 11 is provided at the rear with a recess or slot 30, in which the leg 24 connected to such draft frame moves, and the arrangement is such that when the pin 26 is in the forward end of the slot 27, the pin 29 will lie forward of the recess 30, and the leg be thereby held in its raised position. By raising up and drawing back the leg 24 the pin 29 will be disengaged, permitting the leg to be drawn down into contact with the ground, as shown by dotted lines in Fig. 2. Instead of providing the leg 24 with a pin 29, as shown, it may be provided with a hole adapted to receive a pin carried by the draft frame, which would be the converse of the construction shown.

I do not wish to limit myself to the use of a slot 27 curved as shown.

It is obvious that instead of mounting the dog 20 upon the bracket 7, the draft frame may carry the dog and a suitable recess or stop be provided upon the bracket 7.

That which I claim as my invention, and desire to secure by Letters Patent, is—

1. In a tongueless cultivator, the combination with an arch, and bracket 7, of a dog 20, draft frame having a recess adapted to receive said dog, and a wheel axle carried by said draft frame, substantially as described.

2. In a tongueless cultivator, the combination with an arch, and a swinging draft frame, having a slot 27, of devices for locking said draft frame in a stationary position, a leg 24, a pin 29, and a recess 30 adapted to receive said pin, substantially as described.

3. In a tongueless cultivator, the combination with an arch, and brackets 7, of a swinging draft frame 11 pivoted to said bracket 7, said frame having a slot 27, a locking device adapted to lock said frame in a stationary position, leg 24, having a pin 26 movable in said slot, a pin 29, and recess 30, substantially as described.

JAMES MACPHAIL.

Witnesses:
S. M. HUNT,
D. P. CARY.